US007327930B2

(12) United States Patent
Koren et al.

(10) Patent No.: US 7,327,930 B2
(45) Date of Patent: Feb. 5, 2008

(54) MODULAR LIGHT-EMITTING DIODE LIGHTING SYSTEM

(75) Inventors: Pinhas P. Koren, Altamonte Springs, FL (US); Stephen Faber, Orlando, FL (US); Cristoffer Kvist, Orlando, FL (US)

(73) Assignee: Nexxus Lighting, Inc., Orlando, FL (US)

( * ) Notice: Subject to any disclaimer, the term of this patent is extended or adjusted under 35 U.S.C. 154(b) by 0 days.

(21) Appl. No.: 11/066,501

(22) Filed: Feb. 25, 2005

(65) Prior Publication Data

US 2006/0023454 A1 Feb. 2, 2006

Related U.S. Application Data

(60) Provisional application No. 60/592,211, filed on Jul. 29, 2004.

(51) Int. Cl.
*G02B 6/00* (2006.01)
*F21V 7/04* (2006.01)
*G09F 13/26* (2006.01)
*F21V 11/00* (2006.01)
*G09F 13/00* (2006.01)

(52) U.S. Cl. ...................... 385/147; 362/551; 362/554; 362/558; 362/565; 362/576

(58) Field of Classification Search ................ 385/147, 385/101; 362/576
See application file for complete search history.

(56) References Cited

U.S. PATENT DOCUMENTS 4,270,734 A * 6/1981 Straight ............... 254/134.3 R
5,149,056 A * 9/1992 Jones ................. 254/134.3 FT
5,821,857 A * 10/1998 Rand ........................ 340/568.8
5,846,099 A * 12/1998 Hiruma et al. .............. 439/620
6,175,201 B1 * 1/2001 Sid ............................ 315/312
6,227,908 B1 * 5/2001 Aumeier et al. ............ 439/607
6,431,524 B1 * 8/2002 Weber ................ 254/134.3 FT
6,467,103 B1 * 10/2002 Gardenier et al. ........... 4/541.1
6,548,967 B1 * 4/2003 Dowling et al. ............ 315/318
6,599,151 B2 * 7/2003 Chiran et al. ............... 439/610
2001/0053627 A1 * 12/2001 Armistead et al. .......... 439/502
2002/0059724 A1 * 5/2002 Weigel ........................ 29/857
2003/0086658 A1 * 5/2003 Koren ......................... 385/58
2003/0204356 A1 * 10/2003 David et al. ................ 702/122
2004/0085754 A1 * 5/2004 Koren et al. .................. 362/96
2005/0047167 A1 * 3/2005 Pederson et al. ........... 362/542
2005/0085120 A1 * 4/2005 Carroll ........................ 439/425
2005/0094962 A1 * 5/2005 Elias et al. ................. 385/147
2005/0128751 A1 * 6/2005 Roberge et al. ............. 362/276
2005/0136747 A1 * 6/2005 Caveney et al. ............ 439/676
2005/0248944 A1 11/2005 Sloan
2005/0266720 A1 * 12/2005 Lin ............................ 439/418

(Continued)

*Primary Examiner*—Michelle Connelly-Cushwa
*Assistant Examiner*—Rhonda S. Peace
(74) *Attorney, Agent, or Firm*—Akerman Senterfitt

(57) ABSTRACT

A modular light system for a spa where replacement of a light emitter, such as but not limited to a LED and/or a cable is accomplished without needing access an area around a tub in the spa. Furthermore, replacing the cable and light emitter can be accomplished individually. The system comprises a light emitter, a power source, a controller, and a plurality of cables. When the light emitter fails, it is disconnected from the cable and replaced with a working light emitter. When the cable fails it may be disconnected from the light emitter and replaced with a working cable.

24 Claims, 5 Drawing Sheets

*FIG. 1*

U.S. PATENT DOCUMENTS

| | | | | |
|---|---|---|---|---|
| 2005/0277335 | A1 * | 12/2005 | Gordon et al. | 439/610 |
| 2006/0019549 | A1 * | 1/2006 | Ciezak et al. | 439/676 |
| 2006/0063406 | A1 * | 3/2006 | Shifris et al. | 439/119 |
| 2006/0084286 | A1 * | 4/2006 | Kooiman | 439/63 |

* cited by examiner

MODULAR LIGHT-EMITTING DIODE LIGHTING SYSTEM

Applicant herein claims priority to the Provisional Patent Application, U.S. Ser. No. 60/592,211 filed Jul. 29, 2004.

BACKGROUND OF THE INVENTION

The present invention relates to light emitting diode (LED) technology, and more particularly to a modular LED lighting assembly and method generally used in spas, saunas, or hot tubs.

Manufactured into most spas, saunas, and/or hot tubs (hereinafter commonly referred to as "spa" or "spas") are a plurality of lights. The number of lights integrated into a spa can vary depending on the purpose of the lights and the size of the spa. Typically, lights are used for both providing illumination for safety concerns and for accentuating the spa to provide an enhanced aesthetic appearance.

Currently, spas are either manufactured with wiring for its lighting system encased within insulation that covers an outer surface of a tub in which an individual sits, or the wiring is run on the outside of the insulation. In either case, the wiring is cut to fit around the given tub dimension. Regardless of how the wire is placed around the tub, the wire is usually inaccessible to a user or manufacturer once installed.

In most circumstances, the light, or light emission device, and wire are permanently affixed to each other wherein if either the wire or light fails individually, both must be replaced. If a light, or light emission device, is detached, such as by cutting it, from a wire connecting it to a power source and/or light source, to simply replace the light emission device, not enough wire is typically available to connect the new light emission device to the existing wire because of the precise cut length of the wire. Furthermore, because of the limited access space provided around a tub, especially when the spa is built into the ground, replacing a defective wire can be expensive and time consuming.

In view of the cost and time that results in having to fix a light not emitting from a spa, manufacturers and spa owners would benefit from a system and device which would minimize the repair time and cost involved.

SUMMARY OF THE INVENTION

The present invention is directed towards a modular light system and method where the primary components, such as but not limited to a light emitter, cable, and controller are readily attachable from the other so that only one of these elements can be replaced if the others are still functioning, or to allow for a lighting system to be installed where one was not presently installed.

Towards this end, in a preferred embodiment a modular light system for a spa is disclosed where replacement of a light emitter and/or a cable is accomplished without needing access an area around a tub in the spa and replacing the cable and light emitter can be accomplished individually. The modular light system comprises a light emitter with a first attachment element at a first end and a power source. A controller is also provided and is connected to the power source and a second attachment element for connection to the first attachment element of the light emitter. A cable is also provided and has a third attachment element at a first end and a fourth attachment element at a second end for connection the cable to the second attachment element on the controller and the first attachment element on the light emitter. When the light emitter fails, it is disconnected from the cable and replaced with a working light emitter and when and the cable fails it is disconnected from the light emitter and replaced with a working cable.

In another preferred embodiment, a light system for replacing a light emitter and a cable connected to the light emitter when the cable is not readily accessible is disclosed. The system comprises a light emitter and a controller connected to the light emitter for at least one of providing power to the light emitter and regulating illumination intensity and illumination duration of the light emitter. A power source connected to the controller and a cable connecting the light emitter to the controller are also disclosed. A first connector and/or a first receiver are fixed to each end of the cable. A second connector and/or a second receiver are connected to the light emitter. A third connector and/or a third receiver is connected to the controller. The first connector and/or the first receiver connected to the cable can be connected to and disconnected to the second connector and/or the second receiver connected to the light emitter and can be connected to and disconnected to the third connector and/or the third receiver connected to the controller.

In another preferred embodiment, a modular light system for a spa is disclosed. The system comprises a controller having a receptacle, a cable, having a first end and a second end with release mechanisms, connected to said receptacle at said a first end of said cable. An adapter having at least a first end into which said second end of said cable attaches and a second end, and a light emitter having a first end that connects to said second end of said adapter are also disclosed.

In another preferred embodiment, a method for replacing a cable installed within a spa is disclosed. The method comprises the steps of disconnecting both ends of said cable from other parts of said spa and attaching a first end of a coupler to a first end of said cable. Additional steps include attaching a second cable to a second end of said coupler and threading said second cable into a location of said first cable by pulling said first cable from said spa. A couple of other steps are disconnecting said coupler from said second cable and connecting said second cable to said other parts of said spa.

BRIEF DESCRIPTION OF THE DRAWINGS

The invention itself, both as to organization and method of operation, may best be understood by reference to the following description in conjunction with the accompanying drawings in which like numbers represent like parts throughout the drawings and in which.

DETAILED DESCRIPTION OF THE INVENTION

With reference to the figures, exemplary embodiments of the invention will now be described. The scope of the invention disclosed is applicable to a plurality of uses. Thus, even though embodiments are described specifically to spas, the present invention is applicable to other uses or applications where wiring for a light system is run around a hard-to-reach-location such as, but not limited to, a swimming pool.

Additionally, other examples of use of the present invention include uses in the area of architectural lighting such as interior and exterior lighting of residential homes, office complexes and/or other buildings. Similarly, the same or other embodiments may be used in landscaping, such as illuminating sidewalks, pools of water, waterfalls or any other area that needs to be illuminated, including underwater applications.

Furthermore, though the present invention is disclosed specific to LED lights, other forms of lights, such as fiber optic lighting, nano-tubes, surface mount lasers, solid state lasers, semiconductor lasers and electrolumenecent diodes and/or tapes, are also applicable to the present invention. Those skilled in the art will readily recognize that a plurality of ways is available to implement the present invention depending on the lighting source used and/or the purpose of the light.

Figure 1:
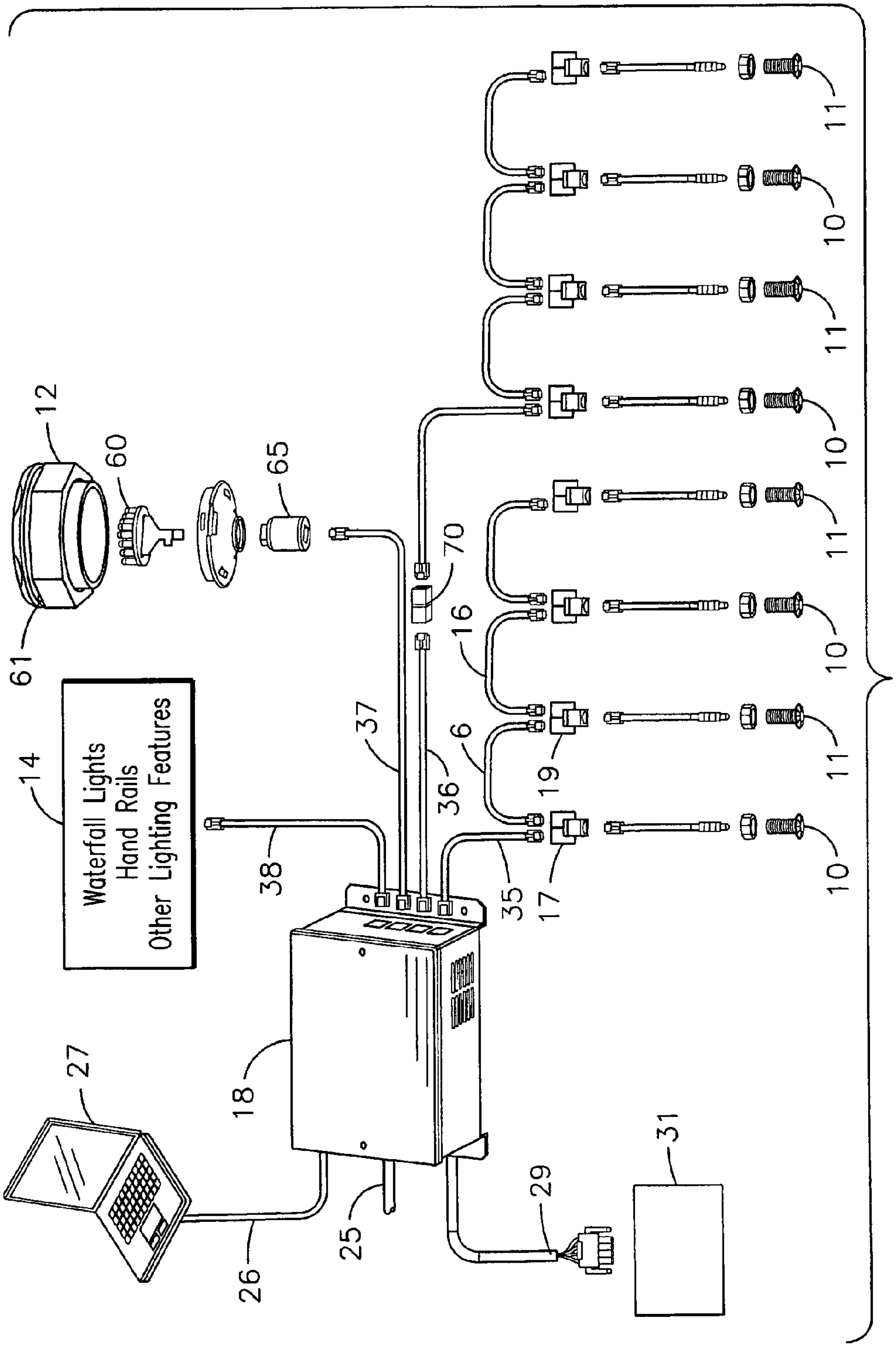
FIG. 1 is an illustration of an exemplary embodiment of a schematic illustrating the present invention.

FIG. 1 is an exemplary embodiment of a schematic illustrating the present invention. Though a plurality of different light emitting devices, or light emitter, may be used, as discussed above, a variety of different light-emitting diode ("LED") fixtures 10, 11, 12, 14 are disclosed as connected to a controller 18. Such LEDs include, but not limited to, a main LED light 12, such as a 12- or 24-LED light, a waterfall feature LED fixture 14, a waterfall light, a pillow light, hand rail, LED candles, lights fixed on or within a speaker (none of which are disclosed), and/or a plurality of single-point LED fixtures 10, 11. As illustrated, in one exemplary embodiment the single-point LED fixtures 10, 11 are daisy-chained together. As illustrated, a connector, line, or cable, 35 leads from the controller 18 into a first adapter 17. A cable 6 extends from the first adapter 17 to a first single-point LED fixture, as further disclosed in FIG. 4-6. From the first adapter 17, a second cable 16 attaches to the first adapter 17 and then to a second adapter 19 and/or directly to a second single-point LED fixture 10, 11.

Figure 3:
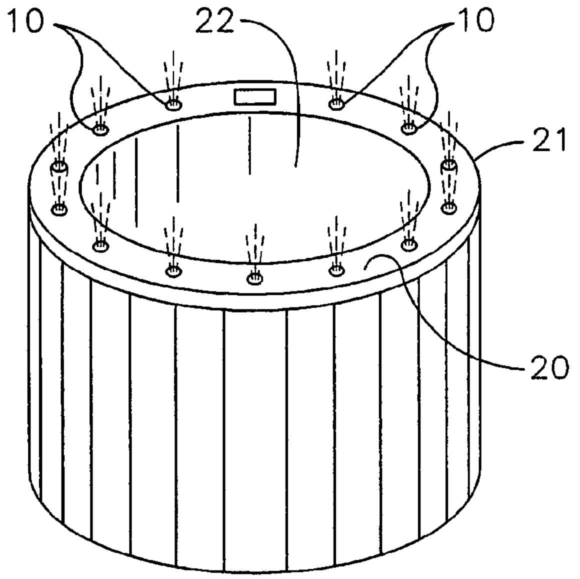
FIG. 3 is an illustration of an exemplary embodiment of spa with lights disposed around a spa deck.

The individual points of light 10, 11, in a preferred embodiment, are positioned around the deck part 20 of the spa 21, as illustrated in FIG. 3. In another preferred embodiment, the individual points of light 10, 11 are positioned within the tub 23 of the spa 21. A power cable 25 is also connected to the controller 18, as well as a line 26 leading to a programming device 27, such as a computer. A cable 29 is also provided allowing the system to be connected to a music device 31 wherein the lights may be programmed to illuminate at a rate in response to the music.

The programming device 27 can reconfigure the timing sequence of the lights 10, 12, 14, 16 if certain light patterns are desired, such as in beat with music. Pulse width modulation, pulse amplitude modulation, bit angel modulation, pulse position modulation and/or analog control are exemplary techniques that may be employed by a controller to individually or as a group address the LEDs and alternatively turn on, turn off, brighten and/or dim them either individually or in combination as necessary. The controller 18 can, but is not limited to, dim and/or intensify the light, and/or vary the speed of the color change or changing the colors that are emitted from the light or lights. The various color modes include, but are not limited to, color changing mode, party mode, dimming mode and showroom mode (making it dimmer or brighter for showroom display). The controller 18 is able to perform these functions for either a specific light or a specific group of lights.

Figure 2:
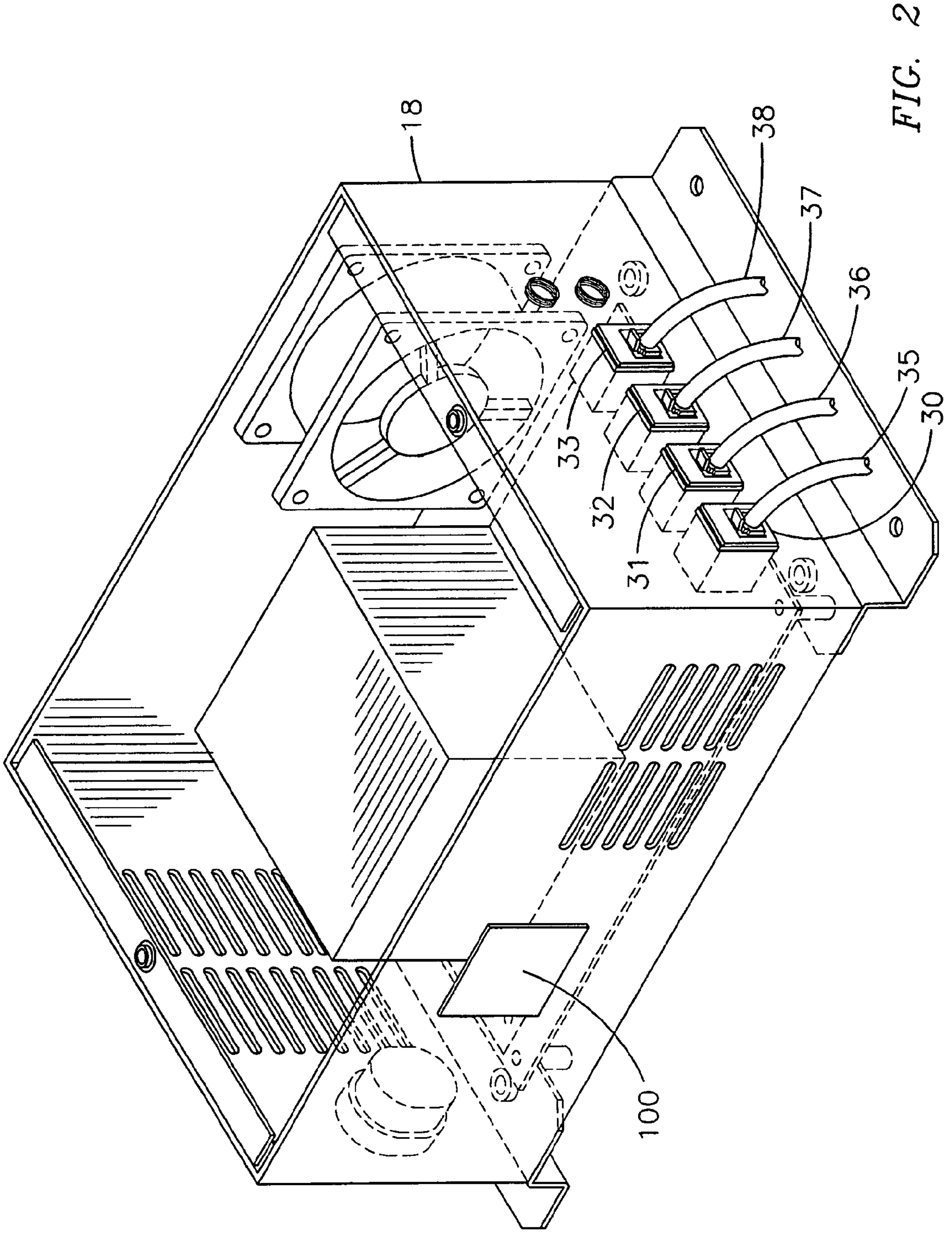
FIG. 2 is an illustration of an exemplary embodiment of a controller.

FIG. 2 is an exemplary illustration of a controller 18. As illustrated, outlets, receptacles, connectors, 30, 31, 32, 33 are provided to connect the various light fixtures 10, 12, 14, 16 to the controller 18. These outlets 30, 31, 32, 33 are configured so that the wires connecting the light fixtures 10, 11, 12, 14, controller, and/or music source are readily detachable from the controller 18 instead of being hardwired to the controller. In a preferred embodiment, the outlets 30, 31, 32, 33 are uniform so that a light fixture can be connected to any outlet 30, 31, 32, 33, but ones skilled in the art may employ an approach where each outlet serves a particular purpose.

In a preferred embodiment, a display 100 is provided on the controller 18 where color change and/or color pattern is visible on the controller 18. Thus, within the display LEDs are provided, connected to the same emitters that transmit signals along the cables 35, 36, 37, 38 to illuminate at a rate established by the controller 18. In a preferred embodiment, cables 35, 36, 37, 38 are detachable from both the controller 18 and from the lights 10, 11, 12, 14. Furthermore, the cables 25, 26, 29 leading to the music source, power source, and programmer, may also be detachable from the controller 18 at one end and the respective end source at a second end. Thus, from a manufacturing standpoint, various lengths of cable 35, 36, 37, 38 are manufactured, wherein the user can connect different lengths to the controller 18 which are specific to the user's intended use.

Figure 4:
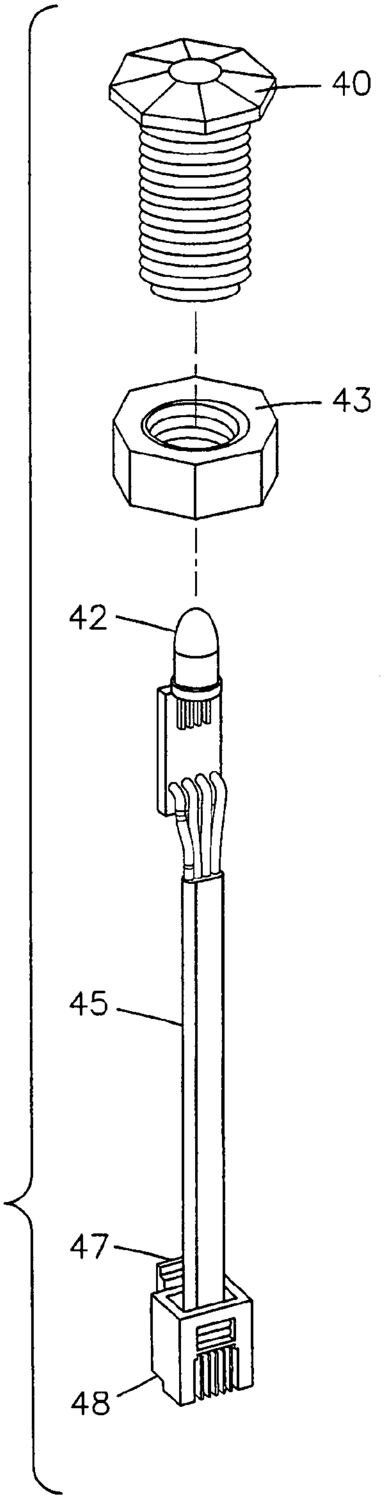
FIG. 4 is an illustration of an exemplary embodiment of a spa light further illustrating the present invention.

As further illustrated in FIG. 4, a lens 40, such as a star point lens, is provided and is positioned within a deck 20 of the spa 21, as is shown in FIG. 3. A LED 42 fits within and/or beneath the lens 40 and is secured to the lens 40 by an element or elements 43 to secure these components, wherein power and control signals provided to the LED are provided through a cable 45 that connects to the LED at one end. The second end of the cable 45 has a connector 48 that is attachable and detachable from a second power cable 35, 36, 37, 38 and/or an adapter 17, 19.

As further illustrated in FIG. 4, the lens 40 can be opened or disconnected so that the LED 42 is accessible. Once accessible, the LED 42 can be removed, such as when the LED 42 ceases to illuminate. In a preferred embodiment illustrated in FIG. 5, a clip 47, which is part of the end connector 48 is depressed releasing the connector 48 from a receiver cable 35, 36, 37, 38 and/or adapter 17, 19. Thus, in one embodiment, once the lens 40 is removed, enough cable 45 is provided, so that the LED 42 can be easily pulled from the lens component 43 and then disconnected by depressing the detent 47. Those skilled in the art will readily recognize that though a detent is disclosed, other release mechanisms are available wherein activation would release the connector 48 from an element that it is attached to.

As further illustrated in FIGS. 1, 2, and 4, the cable and connectors use phone jack connectors and receivers. As illustrated, the cables and jack connectors are phone cables and jacks where the transfer of data, namely control signals, and power occurs through the phone cables and jacks. With respect to FIG. 4, viewing the connector 45 as a male connector, it fits within a female connector, such as one that is fixed to the second cable 35, 36, 37, 38, located within an adapter 17, and/or directly into the controller 18.

Figure 5:
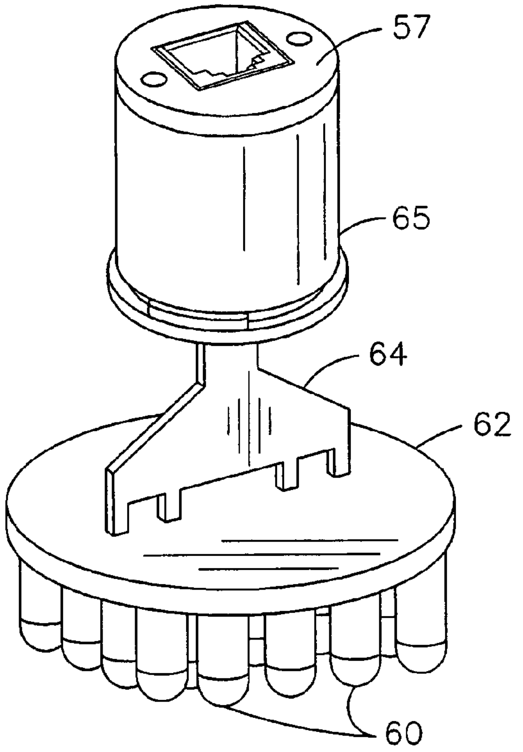
FIG. 5 is an illustration of an exemplary embodiment of a main spa light further illustrating the present invention.

FIG. 5 is an exemplary illustration of a connector that is used with an underwater LED accent light and/or main spa light 12 that comprises a plurality of LEDs 60 within a lens 61. As illustrated, the back of a panel 62 that each LED 60 is connected to has an extension 64 through which and/or on which wires leading to the LEDs 60 are placed. The extension 64 is connected to a joint 65 that has a receiving end 57, illustrated as a female connector, to connect the spa light to a power source and/or signal source 18, through cables 6, 35, 36, 37, 38, having a male connector, which provides power and/or a signal to the LEDs 60.

Figure 6:
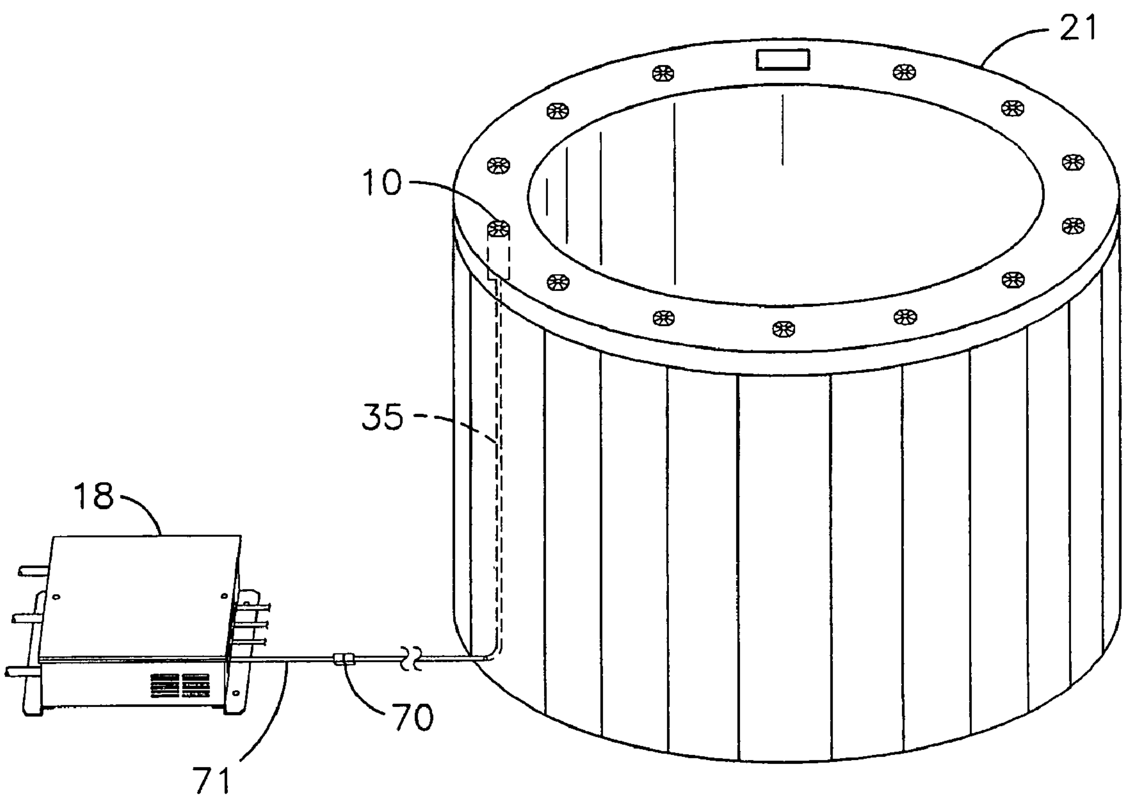
FIG. 6 is an illustration of an exemplary embodiment of a spa with a cable requiring replacement further illustrating the present invention.

Within a spa 20, the controller 18 is usually positioned at a location where it is accessible by a user. Thus, all cables 35, 36, 37, 38 leading from the controller 18 are usually accessible at the controller 18. However, the pathways for the cables 35, 36, 37, 38 connected to the controller 18 and leading to light emitters 10, 11, 12, 14 are usually not accessible. As illustrated in FIG. 6, if a cable between a light emitter 10 and the controller 18 must be removed, a user must first disconnect each end of the cable 35 from the controller 18 and the light emitter 10. Once disconnected, a coupler, joiner element, or joiner, 70 is connected to either end of the cable 35 and a new cable 71 is then connected to the other end of the joiner 70. The coupler 70 can be configured a plurality of ways.

Figure 7A:
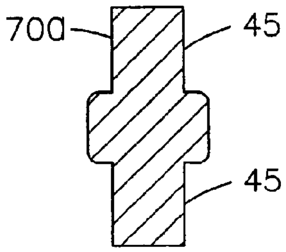
FIG. 7*a* is an illustration of an exemplary embodiment of a coupler with two male ends.
Figure 7B:
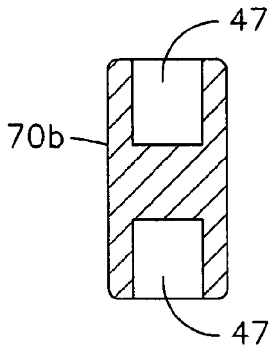
FIG. 7*b* is an illustration of an exemplary embodiment of a coupler with two female ends.
Figure 7C:
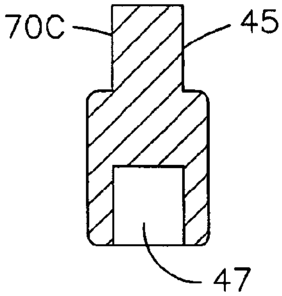
FIG. 7*c* is an illustration of an exemplary embodiment of a coupler with a male and a female end.

As illustrated in FIGS. 7*a*, 7*b*, and 7*c*, the coupler 70 can have two male ends 70*a*, two female ends 70*b*, or a male and a female end 70*c*. Thus, if the cable 35 being removed has male ends 45, the joiner 70*b* with two female ends 47 is used where a first end of the joiner 70*b* is connected to one end of the cable 35, such as the end that is connected to the controller 18. At the second end of the cable 35, a replacement cable 71 is connected. In a preferred embodiment, the joiner 70*a*, 70*b*, 70*c* has a diameter nearly as small as the cable 35 being removed. Thus, a user can then pull the old cable 35 out, which in turn pulls the new cable 71 into place.

Figure 7D:
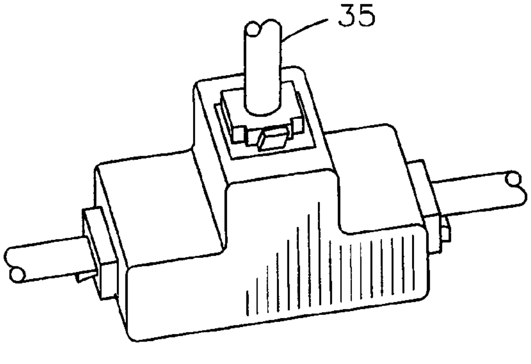
FIG. 7*d* is an illustration of an exemplary embodiment of a coupler with three connection ends.

As further illustrated in FIG. 1, the coupler is also used to connect cables together when shorter cables are used in place of a longer single cable. In another exemplary embodiment, the coupler has more than two connection ends, such as three, as illustrated in FIG. 7*d*, four, or more, to allow either lights or additional cables to be connected at a single joint.

In another preferred embodiment, though not illustrated, the present invention can be used to provide a lighting system to older spas that were manufactured without a lighting system. A hole-forming device, such as a drill, can be used to create holes in the spa, either along the deck or directly into the spa, through which light emitters 10, 11 are placed. As disclosed above, the coupler(s) 17, 19 can be used to thread wires, or cables 6, 35, 36, 37, 38 from the controller 18 to the light source 10, 11, 12, 14, and/or music source.

While the invention has been described in what is presently considered to be a preferred embodiment, many variations and modifications will become apparent to those skilled in the art. Accordingly, it is intended that the invention not be limited to the specific illustrative embodiment, but be interpreted within the full spirit and scope of the appended claims.

What is claimed is:

1. A modular light system for a spa where replacement of at least one of a light emitter and a cable is accomplished without needing access to an area around a tub in said spa and replacing said cable and light emitter can be accomplished individually, said system comprising:

a light emitter having an attachment element;

a controller to regulate at least power and a signal that are provided to the light emitters, the controller having at least one attachment element;

a plurality of cables that electrically couple the light emitter and the controller; and at least one coupler that is provided between the light emitter and the controller, wherein the at least one coupler is configured to detachably couple at least two cables, wherein said at least one coupler is configured to have a coupler size that is similar to a cable size of at least one of said cables detachably coupled thereto, wherein one of the at least two said cables includes a first connector that detachably couples to the light emitter attachment element, and wherein another of the at least two cables includes a second connector that detachably couples to said at least one controller attachment element, wherein the coupler and cable sizes allow the at least one coupler and the at least one of said detachably coupled cables to be positioned together through an inaccessible cable pathway of said spa.

2. The system of claim 1, further comprising a release mechanism that is coupled to at least one of the first connector and the second connector, wherein at least a connection between the first connector and the light emitter attachment element and a connection between the second connector and the at least one controller attachment element is severed by activating the release mechanism.

3. The system of claim 2 wherein said release mechanism comprises a detent that engages at least of one of the light emitter attachment element and the at least one controller attachment element.

4. The system of claim 1, wherein the coupler includes a phone jack type coupler.

5. The system of claim 4 wherein the phone jack type coupler includes a first end and a second end comprising a male connector and a female connector.

6. The system of claim 1 wherein said light emitter comprises at least one of a light emitter diode, fiber optic lighting, nano-tube lighting, surface mount laser lighting, solid state laser lighting, semiconductor laser lighting, an electroluminescent diode, and electroluminescent tape.

7. The system of claim 1 wherein said controller is configured to determine at least one of a timing sequence and an illumination intensity of said light emitter.

8. The system of claim 7 wherein said controller uses at least one of a pulse width modulation technique, a pulse amplitude modulation technique, a bit angel modulation technique, a pulse position modulation technique, and an analog control technique to perform at least one of turn on, turn off, brighten, and dim said light emitter.

9. The system of claim 1 wherein the light emitter attachment element and one of the at least one controller attachment element include a male connector configuration.

10. The system of claim 1 wherein the light emitter attachment element and one of the at least one controller attachment elements include a female connector configuration.

11. The system of claim 1, wherein the at least one coupler includes at least three cable connection portions.

12. A modular lighting system, said system comprising:

a light emitter having an attachment element;

a controller that is electrically coupled to said light emitter for at least one of providing power to said light emitter and regulating an illumination intensity and an illumination duration of said light emitter in response to a music source that is coupled to said controller, the controller having at least one attachment element; and a plurality of cables interconnected by at least one coupler, said plurality of cables electrically coupling said light emitter to said controller, wherein the at least one coupler is configured to detachably couple at least two cables, said at least one coupler having a coupler size that is similar to a cable size of at least one of said cables detachably coupled thereto, wherein at least one of said plurality of cables includes a first connector that detachably couples to the light emitter attachment element and a second connector that detachably couples to said at least one coupler, wherein at least another of said plurality of cables includes a third connector that detachably couples to said at least one controller attachment element and a fourth connector that couples to said at least one coupler, and wherein at least the light emitter, the plurality of cables and the at least one coupler are located within a spa or swimming pool, wherein the coupler and cable sizes allow the at least one coupler and the at least one of said cables to be positioned together through an inaccessible cable pathway of said spa or said swimming pool.

13. The system of claim 12 further comprising:

a release mechanism provided at the first connector and the third connector, wherein a connection between the first connector and the light emitter attachment element and a connection between the third connector and the at least one controller attachment element is severed by activating the release mechanism.

14. The system of claim 13 wherein said release mechanism comprises a detent attached to at least of one of said first connector, and said third connector.

15. The system of claim 12, wherein the at least one coupler includes at least three cable connection portions.

16. The system of claim 12 wherein said light emitter comprises at least one of a light emitter diode, fiber optic lighting, nano-tube lighting, surface mount laser lighting, solid state laser lighting, semiconductor laser lighting, an electroluminescent diode, and electroluminescent tape.

17. The system of claim 12 wherein said controller is configured to determine at least one of timing sequence and an illumination intensity of said light emitter.

18. The system of claim 17 wherein said controller uses at least one of a pulse width modulation technique, a pulse amplitude modulation technique, a bit angel modulation technique, a pulse position modulation technique, and an analog control technique to perform at least one of turn on, turn off, brighten, and dim said light emitter.

19. A modular light system for a spa, said system comprising:

a controller having a receptacle;

a light emitter having a connector that is electrically coupled to the controller;

an adapter that is positioned between the controller and the light emitter to electrically couple the controller and the light emitter, wherein the adapter includes at least a first adapter end and a second adapter end; and at least two cables interconnected by at least one coupler, said at least two interconnected cables electrically coupling the controller and the light emitter, wherein one of the at least two cables includes a first connector that detachably couples to the receptacle and a second connector that detachably couples to the coupler, said at least one coupler has a coupler size that is similar to a cable size of at least one of said cables detachably coupled thereto, wherein another of the at least two cables includes a third connector that detachably couples to the coupler and a fourth connector that detachably couples to the first adapter end, wherein the light emitter connector detachably couples to the second adapter end, and wherein the controller is configured to provide and regulate power for the light emitter, wherein the coupler and cable sizes allow the at least one coupler and the at least one of said cables to be positioned together through an inaccessible cable pathway of said spa.

20. The system of claim 19 further comprising a release mechanism that is coupled to at least one of the first connector, the second connector, the third connector, and the fourth connector.

21. The system of claim 20, wherein the release mechanism comprises a detent.

22. The system of claim 19 further comprising a second light emitter that is permanently connected to said first light emitter and that is coupled to said second adapter end.

23. A method for replacing a cable of a modular light system that is installed within an inaccessible cable pathway in a spa, said method comprising:

pressing a first release mechanism, located at a first end of a first cable positioned within the inaccessible cable pathway, to disengage the first end of the first cable from a first other component;

pressing a second release mechanism, located at a second end of the first cable, to disengage the second end of the first cable from a second other component;

engaging the first release mechanism with a fast end of a coupler and securing said fast end of said coupler to said first end of said fast cable, said coupler having a coupler size that is similar to a cable size of said first cable;

engaging a third release mechanism, located on a fast end of a second cable, with a second end of the coupler and securing said first end of said second cable to said second end of said coupler;

pulling the first cable and the coupler through the inaccessible cable pathway of the spa to position the second cable in said inaccessible cable pathway;

pressing the third release mechanism to release the second end of the coupler from said second cable; and engaging the third release mechanism to said first other component previously engaged by the first release mechanism of the first cable; and engaging a fourth release mechanism, located on a second end of a second cable, to said second other component previously engaged by the second release mechanism of the first cable.

24. The method of claim 23 wherein engaging or disengaging the first release mechanism, the second release mechanism, the third release mechanism, or the fourth release mechanism, includes engaging or disengaging at least one of a male connector that fits within a female connector and a female connector that fits around a male connector.

* * * * *